United States Patent
Naik et al.

(10) Patent No.: US 10,814,907 B2
(45) Date of Patent: Oct. 27, 2020

(54) STEERING CORRECTION FOR STEER-BY-WIRE

(71) Applicant: Ford Global Technologies, LLC, Dearborn, MI (US)

(72) Inventors: Anand Pradip Naik, Royal Oak, MI (US); Steven R. El Aile, Sterling Heights, MI (US); Oliver Nehls, Düsseldorf/Nordrhein-Westfalen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 206 days.

(21) Appl. No.: 16/161,664

(22) Filed: Oct. 16, 2018

(65) Prior Publication Data
US 2020/0114953 A1   Apr. 16, 2020

(51) Int. Cl.
| B62D 5/04 | (2006.01) |
|---|---|
| B62D 15/02 | (2006.01) |
| B62D 6/00 | (2006.01) |
| G01L 5/22 | (2006.01) |
| B62D 6/10 | (2006.01) |

(52) U.S. Cl.
CPC .......... *B62D 5/0493* (2013.01); *B62D 6/002* (2013.01); *B62D 15/024* (2013.01); *B62D 6/008* (2013.01); *B62D 6/10* (2013.01); *G01L 5/22* (2013.01)

(58) Field of Classification Search
CPC .... B62D 5/0493; B62D 6/002; B62D 15/024; B62D 6/008; B62D 6/10; G01L 5/22
See application file for complete search history.

(56) References Cited

U.S. PATENT DOCUMENTS

| 7,100,733 B2 | 9/2006 | Zhao |
|---|---|---|
| 8,504,243 B2 | 8/2013 | Kageyama |
| 9,031,745 B2 | 5/2015 | Bahena et al. |
| 2018/0281844 A1* | 10/2018 | Wijffels ................. B62D 1/181 |

FOREIGN PATENT DOCUMENTS

| DE | 102014226615 A1 | 6/2016 |
|---|---|---|
| JP | 200662627 A | 3/2006 |
| JP | 5018166 B2 | 9/2012 |

* cited by examiner

*Primary Examiner* — Michael D Lang
(74) *Attorney, Agent, or Firm* — Raymond L. Coppiellie; Bejin Bieneman PLC

(57) ABSTRACT

A computer includes a processor and a memory storing instructions executable by the processor to determine a learned clear vision offset based on a currently calculated clear vision offset and a previously stored clear vision offset, and steer a steer-by-wire system of a vehicle while correcting a steering angle by a lesser value of the learned clear vision offset and a maximum correctable offset.

20 Claims, 3 Drawing Sheets

STEERING CORRECTION FOR STEER-BY-WIRE

BACKGROUND

A steering system for a vehicle controls the turning of the road wheels. Conventional steering systems include rack-and-pinion systems with electric power-assisted steering, and steer-by-wire systems. Steering systems can include an electronic control unit (ECU) that is in communication with and receives input from a vehicle controller and/or a human driver. The human driver may control the steering via a steering wheel.

Clear vision offset is the degree of offset between an actual turn of the road wheels and a turn of the road wheels expected from a position of the steering wheel. An increase in the clear vision offset can be caused by an impact to the vehicle or by normal use of the vehicle over an extended period of time. Clear vision offset can make operation of the vehicle more difficult or confusing by forcing the human driver to turn the steering wheel off of the center position to keep the vehicle driving straight, or if the vehicle is operating autonomously, rotating the steering wheel to a position different than expected by an occupant of the vehicle.

DETAILED DESCRIPTION

Figure 1:
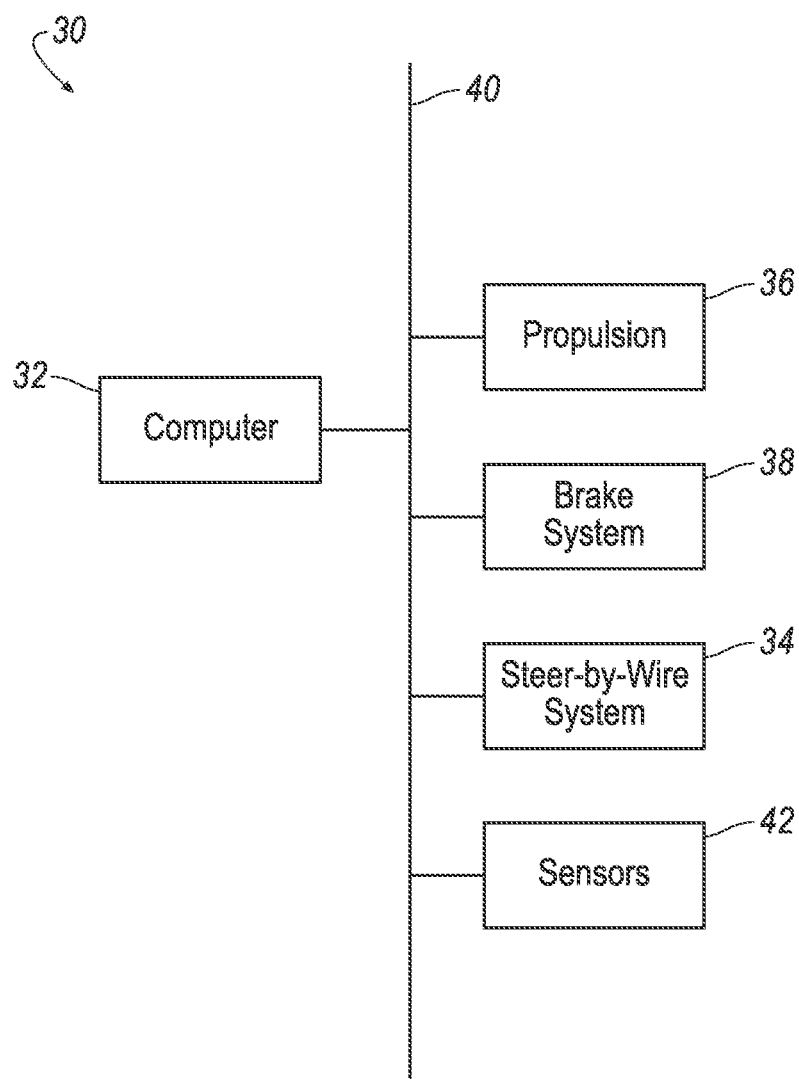
FIG. 1 is a block diagram of an example vehicle.

The system described herein can correct for clear vision offset while reducing the need for the vehicle to visit a repair facility. The system can accurately determine the clear vision offset and can correct for clear vision offset that builds up over time. Thus, the vehicle may only need to visit a repair facility for realignments at normally scheduled intervals or if the vehicle is damaged from an impact, reducing visits to the repair facility. The correction for the clear vision offset can make the driving or riding in the vehicle easier for a human operator or occupant by actuating a motor with a correction to the steering angle applied to road wheels or the steering-wheel angle applied to a steering wheel.

A computer includes a processor and a memory storing instructions executable by the processor to determine a learned clear vision offset based on a currently calculated clear vision offset and a previously stored clear vision offset, and steer a steer-by-wire system of a vehicle while correcting a steering angle by a lesser value of the learned clear vision offset and a maximum correctable offset.

Correcting the steer angle may include one of revising a steering-wheel angle received from a steering wheel, revising the steering angle, or actuating a motor to rotate the steering wheel.

The processor may be further programmed to set a flag in response to the learned clear vision offset exceeding the maximum correctable offset.

Determining the learned clear vision offset may include filtering the currently calculated clear vision offset and a plurality of previously stored clear vision offsets including the previously stored clear vision offset.

The previously stored clear vision offset may be an immediately previously stored clear vision offset, and the processor may be further programmed to erase the learned clear vision offset in response to the currently calculated clear vision offset and the immediately previously stored clear vision offset both exceeding a threshold difference from the learned clear vision offset. The processor may be further programmed to erase a plurality of nonimmediately previously stored clear vision offsets in response to the currently calculated clear vision offset and the immediately previously stored clear vision offset both exceeding the threshold difference from the learned clear vision offset.

The processor may be further programmed to calculate the currently calculated clear vision offset upon determining that the vehicle is driving substantially straight. Calculating the currently calculated clear vision offset may include finding a difference of a steering-wheel angle and one of a straight-ahead position of a steering wheel and a product of the steering angle and a steering ratio.

The processor is further programmed to store the currently calculated clear vision offset as the previously stored clear vision offset.

A method includes determining a learned clear vision offset based on a currently calculated clear vision offset and a previously stored clear vision offset, and steering a steer-by-wire system of a vehicle while correcting a steering angle by a lesser value of the learned clear vision offset and a maximum correctable offset.

Correcting the steering angle may include one of revising a steering-wheel angle received from a steering wheel, revising the steering angle, and actuating a motor to rotate the steering wheel.

The method may further include setting a flag in response to the learned clear vision offset exceeding the maximum correctable offset.

Determining the learned clear vision offset may include filtering the currently calculated clear vision offset and a plurality of previously stored clear vision offsets including the previously stored clear vision offset.

The previously stored clear vision offset may be an immediately previously stored clear vision offset, and the method may further include erasing the learned clear vision offset in response to the currently calculated clear vision offset and the immediately previously stored clear vision offset both exceeding a threshold difference from the learned clear vision offset. The method may further include erasing a plurality of nonimmediately previously stored clear vision offsets in response to the currently calculated clear vision offset and the immediately previously stored clear vision offset both exceeding the threshold difference from the learned clear vision offset.

The method may further include calculating the currently calculated clear vision offset upon determining that the vehicle is driving straight. Calculating the currently calculated clear vision offset may include finding a difference of a steering-wheel angle and one of a straight-ahead position of a steering wheel and a product of the steering angle and a steering ratio.

The method may further include storing the currently calculated clear vision offset as the previously stored clear vision offset.

A system includes a steer-by-wire system, and a computer programmed to determine a learned clear vision offset based on a currently calculated clear vision offset and a previously stored clear vision offset, and steer the steer-by-wire system while correcting a steering angle by a lesser value of the learned clear vision offset and a maximum correctable offset.

The steer-by-wire system may include a steering wheel communicatively coupled to the computer and a motor operably coupled to the steering wheel, and correcting the steering angle may include one of revising a steering-wheel angle received from the steering wheel, revising the steering angle, and actuating the motor to rotate the steering wheel.

With reference to the Figures, a computer 32 includes a processor and a memory storing instructions executable by the processor to determine a learned clear vision offset based on a currently calculated clear vision offset and a previously stored clear vision offset, and steer a steer-by-wire system 34 of a vehicle 30 while correcting a steering angle by a lesser value of the learned clear vision offset and a maximum correctable offset.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. The computer 32 can be programmed to operate the vehicle 30 independently of the intervention of a human driver, completely or to a lesser degree. The computer 32 may be programmed to operate a propulsion 36, a brake system 38, the steer-by-wire system 34, and/or other vehicle systems. For the purposes of this disclosure, autonomous operation means the computer 32 controls the propulsion 36, brake system 38, and steer-by-wire system 34 without input from a human driver; semi-autonomous operation means the computer 32 controls one or two of the propulsion 36, brake system 38, and steer-by-wire system 34 and a human driver controls the remainder; and nonautonomous operation means a human driver controls the propulsion 36, brake system 38, and steer-by-wire system 34.

The computer 32 is a microprocessor-based controller. The computer 32 includes a processor, memory, etc. The memory of the computer 32 includes memory for storing instructions executable by the processor as well as for electronically storing data and/or databases.

The computer 32 may transmit and receive data through a communications network 40 such as a controller area network (CAN) bus, Ethernet, WiFi, Local Interconnect Network (LIN), onboard diagnostics connector (OBD-II), and/or by any other wired or wireless communications network. The computer 32 may be communicatively coupled to the propulsion 36, the brake system 38, the steer-by-wire system 34, sensors 42, and other components via the communications network 40.

The propulsion 36 of the vehicle 30 generates energy and translates the energy into motion of the vehicle 30. The propulsion 36 may be a conventional vehicle propulsion subsystem, for example, a conventional powertrain including an internal-combustion engine coupled to a transmission that transfers rotational motion to road wheels 44; an electric powertrain including batteries, an electric motor, and a transmission that transfers rotational motion to the road wheels 44; a hybrid powertrain including elements of the conventional powertrain and the electric powertrain; or any other type of propulsion. The propulsion 36 can include an electronic control unit (ECU) or the like that is in communication with and receives input from the computer 32 and/or a human driver. The human driver may control the propulsion 36 via, e.g., an accelerator pedal and/or a gearshift lever.

The brake system 38 is typically a conventional vehicle braking subsystem and resists the motion of the vehicle 30 to thereby slow and/or stop the vehicle 30. The brake system 38 may include friction brakes such as disc brakes, drum brakes, band brakes, etc.; regenerative brakes; any other suitable type of brakes; or a combination. The brake system 38 can include an electronic control unit (ECU) or the like that is in communication with and receives input from the computer 32 and/or a human driver. The human driver may control the brake system 38 via, e.g., a brake pedal.

The steer-by-wire system 34 is typically a conventional vehicle steering subsystem and controls the turning of the road wheels 44, as described in more detail below with respect to FIG. 2. The steer-by-wire system 34 can include an electronic control unit (ECU) or the like that is in communication with and receives input from the computer 32 and/or a human driver. The human driver may control the steering via, e.g., a steering wheel 46. For the purposes of this disclosure, a "steer-by-wire system" is defined as a steering system with a gap in mechanical linkages between the steering wheel 46 or other steering input and the road wheels 44, e.g., input from the steering wheel 46 is electronically communicated to the ECUs, which instruct actuators to turn the road wheels 44, such as by instructing a steering motor 52 to move a steering rack 54. If the vehicle 30 is a fully autonomous vehicle, the steer-by-wire system 34 may lack the steering wheel 46.

The sensors 42 may provide data about operation of the vehicle 30, for example, wheel speed, wheel orientation, and engine and transmission data (e.g., temperature, fuel consumption, etc.). The sensors 42 may detect the location and/or orientation of the vehicle 30. For example, the sensors 42 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 42 may detect the external world, e.g., objects and/or characteristics of surroundings of the vehicle 30, such as other vehicles, road lane markings, traffic lights and/or signs, pedestrians, etc. For example, the sensors 42 may include radar sensors, scanning laser range finders, light detection and ranging (LIDAR) devices, and image processing sensors such as cameras. The sensors 42 may include communications devices, for example, vehicle-to-infrastructure (V2I) or vehicle-to-vehicle (V2V) devices.

Figure 2:
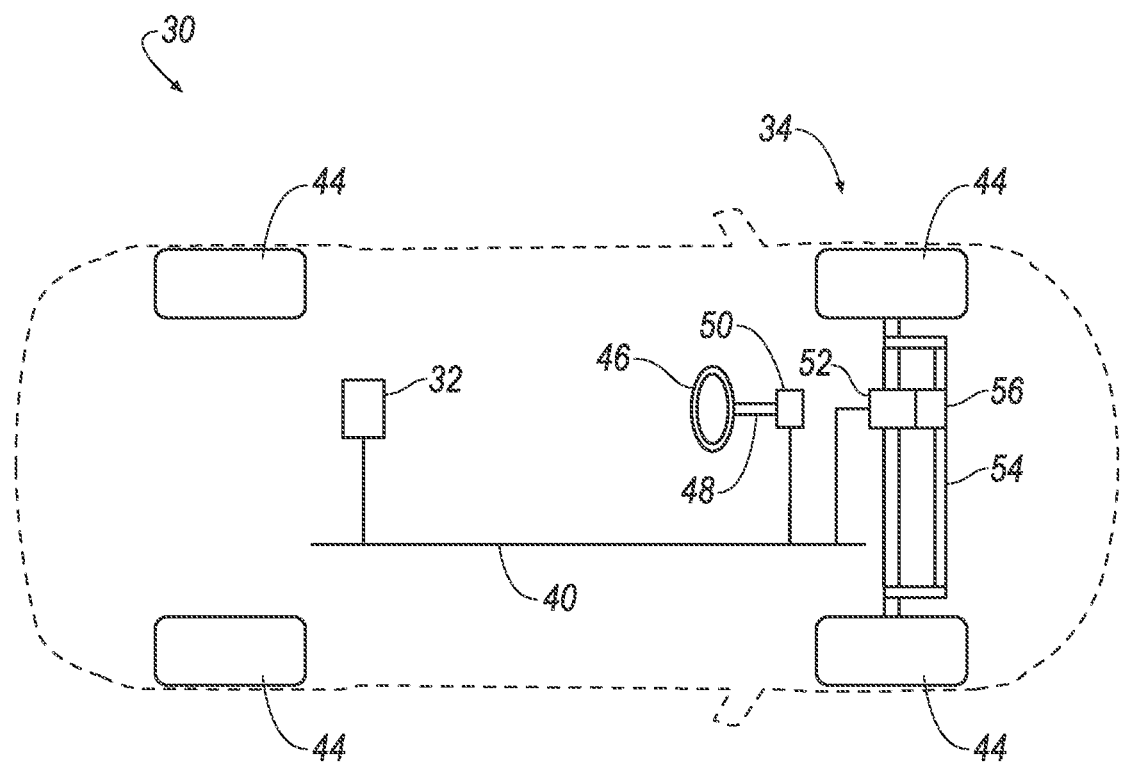
FIG. 2 is a diagram of an example steering system for the vehicle of FIG. 1.

With reference to FIG. 2, the steering wheel 46 allows an operator to steer. The steering wheel 46 may be, e.g., a rigid ring fixedly attached to a steering column 48. The steering column 48 may be, e.g., a shaft connecting the steering wheel 46 to a feedback actuator 50. The steering column 48 may house a clutch and one or more of the sensors 42 such as a torque sensor and/or a position sensor positioned to detect the orientation of the steering wheel 46 (not shown). The position sensor may be, e.g., a Hall effect sensor, a rotary encoder, etc. The position sensor may be in communication with the computer 32 via the communications network 40.

The computer 32 may output a signal to the steering motor 52 via the communications network 40. The steering motor 52 may be one or more electromechanical actuators, e.g., an electric motor, coupled to the steering rack 54, or otherwise turnably coupled to the road wheels 44, and the steering motor 52 may transform the signal into mechanical motion of the steering rack 54 and/or turning of the road wheels 44. The steering rack 54 may be turnably coupled to the road wheels 44, for example, in a four-bar linkage. The position of the steering rack 54 determines the turning of the road wheels 44. Translational motion of the steering rack 54 results in turning of the road wheels 44. The steering motor 52 may be coupled to the steering rack 54 via a rack and pinion 56, that is, gear meshing between a pinion gear and a rack gear (not shown).

The feedback actuator 50 applies a torque to the steering column 48 to provide feedback to the operator. The feedback actuator 50 may be, e.g., an electric motor rotatably coupled to the steering column 48. The feedback actuator 50 may apply torque with a value chosen to simulate torque feedback from a conventional steering system, e.g., based on steering angle and vehicle speed. If the vehicle 30 is operating autonomously, the feedback actuator 50 may apply torque to rotate the steering wheel 46 to a steering-wheel angle related to the steering angle of the vehicle 30, e.g., by a steering ratio.

The sensors 42 provide data about components of the steer-by-wire system 34. For example, the sensors 42 include wheel-speed sensors for the road wheels 44; position and/or inertial sensors on components of the steering system such as the steering wheel 46, the steering column 48, the rack and pinion 56, or the steering rack 54; torque sensors on components of the steering system such as the steering column 48, the rack and pinion 56, the steering motor 52, or the feedback actuator 50; and voltage or current sensors on terminals of the steering motor 52 or feedback actuator 50.

Figure 3:
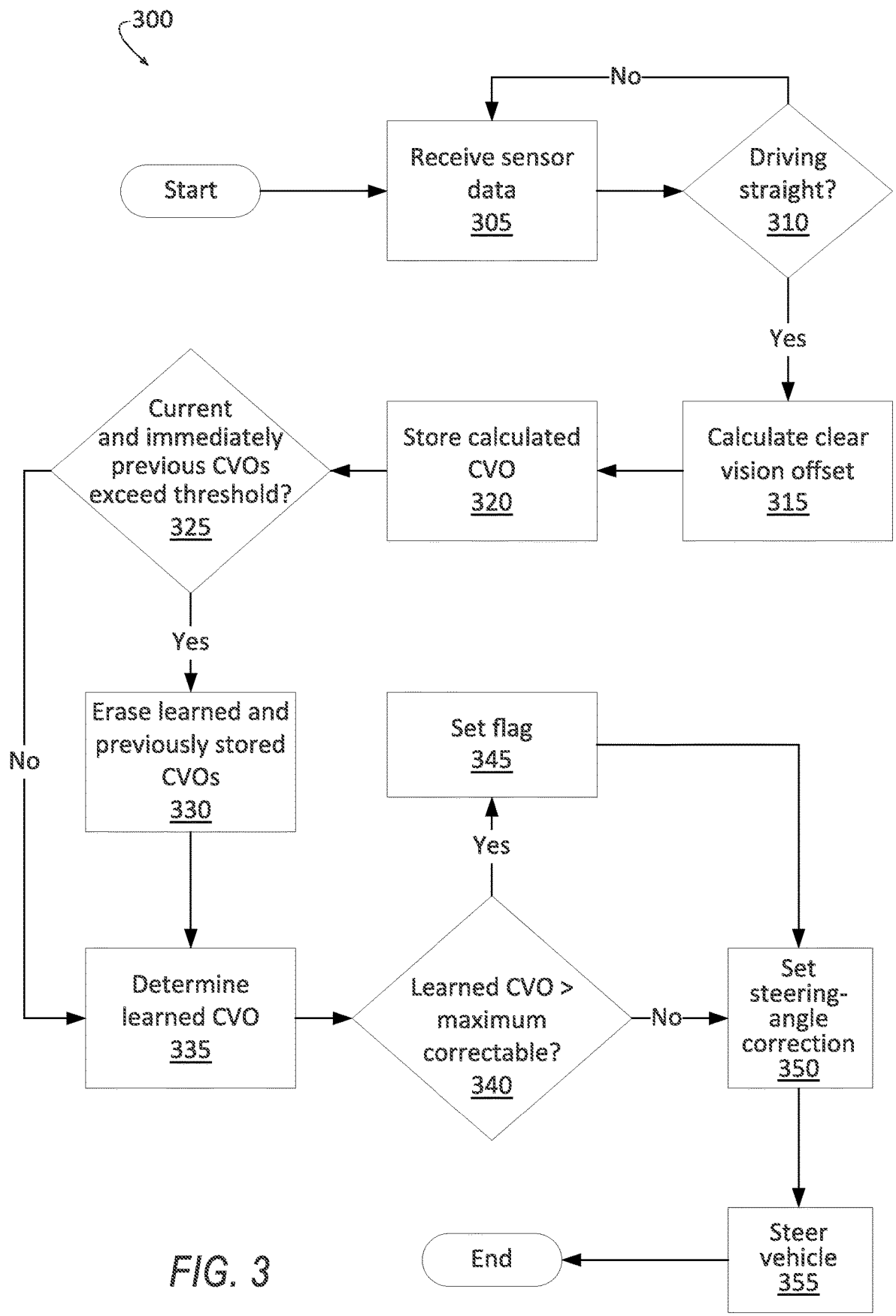
FIG. 3 is a process flow diagram of an example process for steering the vehicle of FIG. 1 based on a clear vision offset.

FIG. 3 is a process flow diagram illustrating an exemplary process 300 for steering the vehicle 30 based on a clear vision offset. For the purposes of this disclosure, a "clear vision offset" is defined as a difference in angle between an actual turn of the road wheels 44 and a turn of the road wheels 44 expected from a position of the steering wheel 46. The clear vision offset may be expressed in degrees in either the steering-angle domain or the steering-wheel-angle domain. For the purposes of this disclosure, a "steering angle" is either the turn of the road wheels 44 relative to straight ahead or the angle of a pinion of the rack and pinion 56 relative to a center position, and a "steering-wheel angle" is a rotation of the steering wheel 46 relative to a center position. The steering-angle domain and the steering-wheel-angle domain are related by a steering ratio. The steering ratio is a ratio between the steering-wheel angle and the steering angle when the vehicle 30 is perfectly aligned, i.e., $R=\theta_{SW}/\theta_S$, in which R is the steering ratio, $\theta_{SW}$ is the steering-wheel angle, and $\theta_S$ is the steering angle. The steering ratio may be a value stored in memory. The steering ratio may be constant, i.e., a single value, or the steering ratio may map onto, e.g., vehicle speed, in which case the steering ratio may be stored in memory as a lookup table. In the steering-angle domain, the clear vision offset is a difference between the steering angle and the steering-wheel angle divided by a steering ratio, i.e., $CVO_{SA}=\theta_S-\theta_{SW}/R$. In the steering-wheel-angle domain, the clear vision offset is a difference between the steering angle multiplied by the steering ratio and the steering-wheel angle, i.e., $CVO_{SWA}=R*\theta_S-\theta_{SW}$. The process 300 may be performed in the steering-angle domain as described below, i.e., by converting steering-wheel-angle quantities to the steering-angle domain, or alternatively in the steering-wheel-angle domain, i.e., by converting steering-angle quantities to the steering-wheel-angle domain.

As a general overview of the process 300, the computer 32 calculates a currently calculated clear vision offset, determines a learned clear vision offset based on the currently calculated clear vision offset and previously stored clear vision offsets, such as by filtering, and corrects the steering angle of the vehicle 30 by a lesser value of the learned clear vision offset and a maximum correctable offset while steering. The memory of the computer 32 stores executable instructions for performing the steps of the process 300. The process 300 may be performed repeatedly, e.g., substantially continuously, to improve the accuracy of the learned clear vision offset as additional currently calculated clear vision offsets are filtered. The learned clear vision offset may be stored in memory during each performance of the process 300 to be used in the filtering during the next performance, as will be described below.

The process 300 begins in a block 305, in which the computer 32 receives data from the sensors 42. For example, the computer 32 may receive data including values for a torque on the steering wheel 46, a rotational speed of the steering wheel 46, a torque exerted by the feedback actuator 50, a steering angle, a pinion velocity, a torque exerted by the steering motor 52, a lateral force on the steering rack 54, a speed of the vehicle 30, a lateral acceleration of the vehicle 30, a yaw rate of the vehicle 30, and/or rotational speeds of the road wheels 44. The "pinion velocity" is a rotational speed of the turning of the road wheels 44. The values in the sensor data may be directly measured by the sensors 42 or inferred from measurements by the sensors 42; e.g., the value for the torques exerted by the feedback actuator 50 and the steering motor 52 may be inferred from the voltages across the terminals of the feedback actuator 50 and the steering motor 52, respectively; the value for the steering angle may be inferred from a linear position of the steering rack 54 or the angle of road-wheel actuators; etc.

Next, in a decision block 310, the computer 32 determines whether the vehicle 30 is driving substantially straight, i.e., whether the steering angle is substantially zero over a preset time period. The preset time period is stored in the memory and may be chosen to minimize false positives. The computer 32 determines whether, for the preset time period, one or more values are substantially equal to the values expected when the vehicle 30 is driving substantially straight. For example, the computer 32 may determine whether the torque on the steering wheel 46 is substantially equal to the torque exerted by the feedback actuator 50, whether the lateral acceleration of the vehicle 30 is substantially zero, whether the rotational speeds of the road wheels 44 are substantially equal to each other, etc. For multiple tests, the computer 32 may determine that the vehicle 30 is driving substantially straight upon determining that all the tests are satisfied; e.g., the computer 32 determines that the vehicle 30 is driving substantially straight upon determining that the torque on the steering wheel 46 is substantially equal to the torque exerted by the feedback actuator 50, that the lateral acceleration of the vehicle 30 is substantially zero, and that the rotational speeds of the road wheels 44 are substantially equal to each other. If the vehicle 30 is not driving substantially straight, the process 300 returns to the block 305 for the computer 32 to receive updated sensor data.

If the vehicle 30 is driving substantially straight, next, in a block 315, the computer 32 calculates the currently calculated clear vision offset. The currently calculated clear vision offset may be a difference of the steering-wheel angle and some quantity corresponding to the direction of the vehicle 30 while driving substantially straight. For example, the currently calculated clear vision offsets may be a difference of the steering-wheel angle and a straight-ahead position of the steering wheel 46, which is then converted from the steering-wheel-angle domain to the steering-angle domain by dividing by the steering ratio, i.e., $CVO_{SA}^{curr}=(\theta_{SW}-\theta_{straight})/R$. The straight-ahead position of the steering wheel 46 may be calibrated in a factory immediately after manufacturing the vehicle 30, and a position sensor of the sensors 42 may measure the steering-wheel angle relative to the precalibrated straight-ahead position of the steering wheel 46. For another example, the currently calculated clear vision offset may be a difference of the steering-wheel angle divided by the steering ratio and the steering angle, i.e., $CVO_{SA}^{curr}=\theta_S-\theta_{SW}/R$.

Next, in a block 320, the computer 32 stores the currently calculated clear vision offset. The computer 32 may continue to store a plurality of calculated clear vision offsets as they are calculated in previous performances of the process 300 until they are erased after, e.g., a realignment, as described below in blocks 325 and 330. The computer 32 may populate a table with the currently calculated clear vision offset and an associated time value at which the currently calculated clear vision offset was recorded. For the purposes of this disclosure, a "calculated clear vision offset" is a clear vision offset calculated at a point in time, the "currently calculated clear vision offset" is the most recently stored calculated clear vision offset, a "previously stored clear vision offset" is a calculated clear vision offset other than the most recently stored one, an "immediately previously stored clear vision offset" is the second most recently stored calculated clear vision offset, and a "nonimmediately previously stored clear vision offset" is a calculated clear vision offset other than the two most recently stored ones. When the computer 32 stores the currently calculated clear vision offset, what had been the currently calculated clear vision offset is stored as the immediately previously stored clear vision offset.

Next, in a block 325, the computer 32 determines whether the currently calculated clear vision offset and the immediately previously stored clear vision offset both exceed a threshold difference from the learned clear vision offset. The learned clear vision offset is determined from the immediately previous performance of the process 300, as will be described below with respect to a block 335; if no value is stored for the learned clear vision offset or for the immediately previously stored clear vision, then the currently calculated clear vision offset and the immediately previously stored clear vision offset are deemed not to exceed the threshold difference from the learned clear vision offset. The threshold difference is chosen to be greater than changes to the clear vision offset from misalignment resulting from general operation of the vehicle 30, and less than changes to the clear vision offset from realignments performed by automotive technicians on the vehicle 30. Clear vision offsets corresponding to misalignments from use may be determined experimentally by measuring the clear vision offset at various mileages while road testing the vehicle 30, and clear vision offsets corresponding to technician realignments may be determined experimentally by measuring the clear vision offset before and after such realignments to the vehicle 30. In response to either the currently calculated clear vision offset or the immediately previously stored clear vision offset not exceeding the threshold difference from the learned clear vision offset, the process 300 proceeds to the block 335.

In response to the currently calculated clear vision offset and the immediately previously stored clear vision offset both exceeding the threshold difference from the learned clear vision offset, next, in a block 330, the computer 32 erases the learned clear vision offset and the nonimmediately previously stored clear vision offsets from the memory. In essence, upon determining that the vehicle 30 has been realigned, the computer 32 erases data related to the clear vision offset from before the realignment.

The block 335 occurs after the block 330, or after the decision block 325 if either the currently calculated clear vision offset or the immediately previously stored clear vision offset do not exceed the threshold difference from the learned clear vision offset. In the block 335, the computer 32 determines the learned clear vision offset based on the calculated clear vision offsets, i.e., based on the currently calculated clear vision offset and the previously stored clear vision offsets. For example, the computer 32 may filter the calculated clear vision offsets to reduce unwanted noise. The learned clear vision offset may be the filtered calculated clear vision offset. The filter may be, e.g., an average of the calculated clear vision offsets, or an average of a set number of the most recent calculated clear vision offsets (i.e., a running average). The averages may weight the calculated clear vision offsets equally or may weight more recent calculated clear vision offsets more heavily. Alternatively, the filter may be a continuous-time filter such as a low-pass filter, e.g., a second-order low-pass filter such as $(as^2+bs+c)/(ds^2+es+f)$, in which a, b, c, d, e, and f are experimentally determined constants. The constants may be chosen by experimenting to determine frequencies in the signal of calculated clear vision offsets that correspond to actual changes in clear vision offset versus noise. The computer 32 stores the learned clear vision offset in the memory, displacing any previous learned clear vision offsets.

Next, in a decision block 340, the computer 32 determines whether the learned clear vision offset exceeds a maximum correctable offset. The maximum correctable offset is a value stored in the memory. The maximum correctable offset may be chosen to be greater than a clear vision offset that occurs normally over the life of the vehicle 30 and less than a clear vision offset caused by damage to the vehicle 30. In response to the learned clear vision offset not exceeding the maximum correctable offset, the process 300 proceeds to a block 350.

In response to the learned clear vision offset exceeding the maximum correctable offset, next, in a block 345, the computer 32 sets a flag indicating that the vehicle 30 should be inspected for possible repairs. For example, the computer 32 may set a diagnostic test code (DTC) in an onboard diagnostics system (e.g., OBD-II) and/or may illuminate a "check engine" light.

The block 350 occurs after the block 345, or after the decision block 340 if the learned clear vision offset does not exceed the maximum correctable offset. In the block 350, the computer 32 sets a correction to the steering angle of the vehicle 30. The correction equals the lesser of the learned clear vision offset and the maximum correctable offset. In other words, the steering angle is corrected by the learned clear vision offset up to the maximum correctable offset. The correction is applied in the steer-by-wire system 34 to bring the steering-wheel angle and the steering angle into agreement. For example, the correction may be applied to revise the steering-wheel angle received from the steering wheel 46. In particular, the correction is multiplied by the steering ratio (to move from the steering-angle domain to the steering-wheel-angle domain) and added to the steering-wheel angle received from the steering wheel 46, and the resulting value is used in place of the steering-wheel angle. For another example, the correction may be applied to revise the steering angle produced by the steering motor 52. The correction is added to the steering angle, and the resulting value is used as the input to the steering motor 52 in place of the steering angle. For another example, if the vehicle 30 is operating fully autonomously, the correction may be applied to revise the steering-wheel angle outputted by the feedback actuator 50. In particular, the correction is multiplied by the steering ratio (to move from the steering-angle domain to the steering-wheel-angle domain) and added to the steering-wheel angle, and the resulting value is used as the input to the feedback actuator 50 in place of the steering-wheel angle.

Next, in a block 355, the computer 32 steers the steer-by-wire system 34 of the vehicle 30 while correcting the steering angle. In other words, the steer-by-wire system 34 receives input from an operator via the steering wheel 46 or from an autonomous-driving algorithm, and the correction is applied to the steering-wheel angle received from the steering wheel 46, to the steering angle sent to the steering motor 52, or to the steering-wheel angle sent to the feedback actuator 50. The computer 32 actuates the steering motor 52 to turn the road wheels 44 with the correction applied. After the block 355, the process 300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. "Substantially" as used herein means that a dimension, time duration, shape, or other adjective may vary slightly from what is described due to physical imperfections, power interruptions, variations in machining or other manufacturing, etc. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
    determine a learned clear vision offset based on a currently calculated clear vision offset and a previously stored clear vision offset; and
    steer a steer-by-wire system of a vehicle while correcting a steering angle by a lesser value of the learned clear vision offset and a maximum correctable offset.

2. The computer of claim 1, wherein correcting the steer angle includes one of revising a steering-wheel angle received from a steering wheel, revising the steering angle, or actuating a motor to rotate the steering wheel.

3. The computer of claim 1, wherein the processor is further programmed to set a flag in response to the learned clear vision offset exceeding the maximum correctable offset.

4. The computer of claim 1, wherein determining the learned clear vision offset includes filtering the currently calculated clear vision offset and a plurality of previously stored clear vision offsets including the previously stored clear vision offset.

5. The computer of claim 1, wherein the previously stored clear vision offset is an immediately previously stored clear vision offset, and the processor is further programmed to erase the learned clear vision offset in response to the currently calculated clear vision offset and the immediately previously stored clear vision offset both exceeding a threshold difference from the learned clear vision offset.

6. The computer of claim 5, wherein the processor is further programmed to erase a plurality of nonimmediately previously stored clear vision offsets in response to the currently calculated clear vision offset and the immediately previously stored clear vision offset both exceeding the threshold difference from the learned clear vision offset.

7. The computer of claim 1, wherein the processor is further programmed to calculate the currently calculated clear vision offset upon determining that the vehicle is driving substantially straight.

8. The computer of claim 7, wherein calculating the currently calculated clear vision offset includes finding a difference of a steering-wheel angle and one of a straight-ahead position of a steering wheel and a product of the steering angle and a steering ratio.

9. The computer of claim 7, wherein the processor is further programmed to store the currently calculated clear vision offset as the previously stored clear vision offset.

10. A method comprising:
    determining a learned clear vision offset based on a currently calculated clear vision offset and a previously stored clear vision offset; and
    steering a steer-by-wire system of a vehicle while correcting a steering angle by a lesser value of the learned clear vision offset and a maximum correctable offset.

11. The method of claim 10, wherein correcting the steering angle includes one of revising a steering-wheel angle received from a steering wheel, revising the steering angle, and actuating a motor to rotate the steering wheel.

12. The method of claim 10, further comprising setting a flag in response to the learned clear vision offset exceeding the maximum correctable offset.

13. The method of claim 10, wherein determining the learned clear vision offset includes filtering the currently calculated clear vision offset and a plurality of previously stored clear vision offsets including the previously stored clear vision offset.

14. The method of claim 10, wherein the previously stored clear vision offset is an immediately previously stored clear vision offset, the method further comprising erasing the learned clear vision offset in response to the currently calculated clear vision offset and the immediately previously stored clear vision offset both exceeding a threshold difference from the learned clear vision offset.

15. The method of claim 14, further comprising erasing a plurality of nonimmediately previously stored clear vision offsets in response to the currently calculated clear vision offset and the immediately previously stored clear vision offset both exceeding the threshold difference from the learned clear vision offset.

16. The method of claim 10, further comprising calculating the currently calculated clear vision offset upon determining that the vehicle is driving straight.

17. The method of claim 16, wherein calculating the currently calculated clear vision offset includes finding a difference of a steering-wheel angle and one of a straight-ahead position of a steering wheel and a product of the steering angle and a steering ratio.

18. The method of claim 16, further comprising storing the currently calculated clear vision offset as the previously stored clear vision offset.

19. A system comprising:
    a steer-by-wire system; and
    a computer programmed to
        determine a learned clear vision offset based on a currently calculated clear vision offset and a previously stored clear vision offset; and
        steer the steer-by-wire system while correcting a steering angle by a lesser value of the learned clear vision offset and a maximum correctable offset.

20. The system of claim 19, wherein the steer-by-wire system includes a steering wheel communicatively coupled to the computer and a motor operably coupled to the steering wheel, and correcting the steering angle includes one of revising a steering-wheel angle received from the steering wheel, revising the steering angle, and actuating the motor to rotate the steering wheel.

* * * * *